United States Patent [19]

Sakata

[11] Patent Number: 4,488,019
[45] Date of Patent: Dec. 11, 1984

[54] TOUCH SIGNAL PROBE

[75] Inventor: Hideo Sakata, Kawasaki, Japan

[73] Assignee: Mitutoyo Mfg. Co., Ltd., Tokyo, Japan

[21] Appl. No.: 482,637

[22] Filed: Apr. 6, 1983

[30] Foreign Application Priority Data

Mar. 16, 1982 [JP] Japan ................... 57-36409

[51] Int. Cl.³ .............................. H01H 3/16
[52] U.S. Cl. ................. 200/61.42; 200/153 K
[58] Field of Search .......... 200/61.42, 61.41, 6 A, 200/153 K; 33/174 L; 340/686; 74/471 XY

[56] References Cited

U.S. PATENT DOCUMENTS 4,155,171  5/1979  McMurtry ............... 33/174 L
4,301,338  11/1981 McMurtry ............... 200/61.41

Primary Examiner—A. D. Pellinen
Assistant Examiner—Morris Ginsburg
Attorney, Agent, or Firm—Koda and Androlia

[57] ABSTRACT

A touch signal probe including a shank, a probe case, a contact sensor shaft, a leaf spring, three stationary contact bases of steel balls, a contact plate having three movable contact bases of contact point screws, a spring, a ring shaped stopper, and a detector, whereby the touch signal probe can be obtained in small sizes and in light weight so that it can be operated with ease and obtained with low cost.

2 Claims, 2 Drawing Figures

TOUCH SIGNAL PROBE

BACKGROUND OF THE INVENTION

1. Field of the Invention

This invention relates to a touch signal probe, and more particularly to an improvement of touch signal probe which electrically detects a touch with an object to be measured.

2. Description of the Prior Art

It is well known that there are three dimension machines which measure the sizes and shape of an object placed on the base plate and are measuring devices which measure a position of an object placed on the cutter base of the machine tool. In such measuring means the touch signal probe is equipped to a moving base which can be moved to any optional direction to the object to be measured. This touch signal probe outputs an electric signal by a touch with the object to be measured so that the measuring means can perform an accurate measuring action.

The touch signal probe in the prior art, however, has a problem of the probe to be in large sizes and heavy weight. This must make the moving base be stronger to equip such probe, which pushes up the cost of this measuring means higher, and further this produces operational problems.

SUMMARY OF THE INVENTION

Accordingly, it is an object of the present invention to provide a touch signal probe in small sizes and light weight.

In keeping with the principles of the present invention, the object is accomplished with a touch signal probe including a shank being detached from a moving table which can be moved to an optional direction to an object to be measured, a probe case being fixed to the shank by a shank fastener, a contact sensor shaft being held to be capable of tilting to the probe case, a leaf spring, the inner end of which is fixed to the contact sensor shaft and the outer end of which is fixed to the probe case so that the contact sensor shaft can be regulated to the position in the diameter direction, three stationary contact bases fixed to the inner bottom of the probe case, a contact plate being fixed to the contact sensor shaft and having three movable contact bases which engage with the stationary contact bases, a spring pressing the movable contact bases to the stationary contact bases, a ring shaped stopper prepared and arranged with the shank fastener with a predetermined gap around the contact sensor shaft, and a detecting means detecting disconnection of each one of the contact point groups which consist of three groups of said stationary contact bases and the moving contact bases.

BRIEF DESCRIPTION OF DRAWINGS

The above mentioned feature and the object of the present invention will become more apparent from the following description made with reference to the accompanying drawings in which the like elements denote the like numerals and in which.

DETAILED DESCRIPTION OF THE EMBODIMENT

Figure 1:
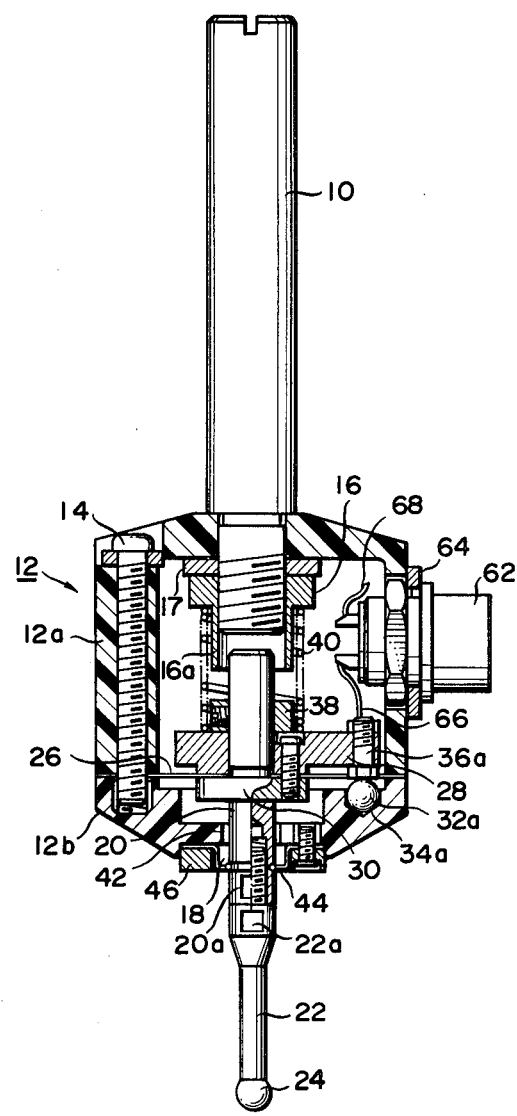
FIG. 1 is a sectional view of the important portion showing a preferred embodiment of a touch signal probe in accordance with the teachings of the present invention.

In FIG. 1 shown therein is a preferred embodiment of a touch signal probe in accordance with the teachings of the present invention. In FIG. 1 a probe case 12 formed by insulating materials of plastic, etc. which is provided thereon with a shank 10 which is detachable from a moving base of measuring devices or machine tools, not illustrated. This probe case 12 is formed with an upper case 12a and a lower case 12b which are detachably fastened by three screws 14, and the upper probe case 12a is fixed to a male screw portion formed on the lower end of the shank 10 by a nut fastener 16 with a washer 17 placed between them.

On the opposite side from the shank 10 on the probe case 12 there is formed an opening 18 through which a contact sensor shaft 20 can be held to move and tilt freely without any interferance by the probe case 12. On the pointed end of the above mentioned contact sensor shaft 20 detachably thereon is a contact sensor 22, and, on the bottom end of the contact sensor 22 adhered thereon is a ball 24 which engages with an object to be measured. The contact sensor shaft 20 is held as mentioned above by a leaf spring 26, the inner end of which is fixed to the contact sensor shaft 20 and the outer end of which is fixed to the probe case 12. In other words, the leaf spring 26 is sandwichingly fixed between a contact plate 28 and a spacer 30 on its inner end, and between the upper probe case 12a and the lower probe case 12b on its outer end. Furthermore, the leaf spring 26 regulates the position of the contact sensor shaft 20 in the diameter direction and can move the contact sensor shaft 20 in the upward, downward and tilted directions.

On the inner bottom of the lower probe case 12b there are stationary contact bases of three steel balls 32a, 32b and 32c buried and fixed in hollows 34a, 34b and 34c in an equal distance. On the other hand, through the previously mentioned contact plate 28 fixed to the contact sensor shaft 20 and consisting of insulating material, there are prepared movable contact bases of three contact point screws 36a, 36b and 36c which engage with the steel balls 32a, 32b and 32c. Each group of contact points is thus formed up by the steel balls 32a, 32b and 32c and the contact point screws 36a, 36b and 36c. Furthermore, a spring holder 38 is attached on the contact sensor shaft 20 on the side of the probe case 12, and a spring 40 is inserted between the spring holder 38 and the outside of a ring shaped stopper 16a formed with the shank fastener 16 so that the contact point screws 36a, 36b and 36c can be pressed on the steel balls 32a, 32b and 32c by the spring 40.

As mentioned hereinabove, in the present invention, the spring 40 provides the suitable contact pressure to the contact point screws 36 and the steel balls 32. The spring 40, therefore, can be selected and changed out of many kinds of springs respectively having different specifications in accordance with various measuring conditions, and it is easy to exchange the spring when broken. Especially, in this embodiment, the spring 40 is easily exchanged since it is simply stopped on its both end by both of the stopper 16a and the spring holder 38. As also mentioned hereinabove, the probe case 12 in accordance with the teachings of the present invention can be divided into both of the upper probe case 12a and the lower probe case 12b, and the spring 40 can be easily exchanged by the simple division of the probe case 12.

Furthermore, the inside wall of the stopper 16a of the shank fastener 16 is formed with a predetermined gap around the contact sensor shaft 20. A predetermined gap is also prepared between the lower probe case 12b and the contact sensor shaft 20. The contact sensor shaft 20, however, is regulated its tilting angle by its engagement with the inside wall of the stopper 16a and an edge 42 of the lower probe case 12b. The opening 18 of the lower probe case 12b is covered with a dust cover 44, the inner end of which engages with the contact sensor shaft 20 and the outer end of which is fixed to the lower probe case 12b by a holding plate 46. The dust cover 44 prevents dust from entering into the probe case 12, and the contact sensor shaft 20 can be easily tilted.

Figure 2:
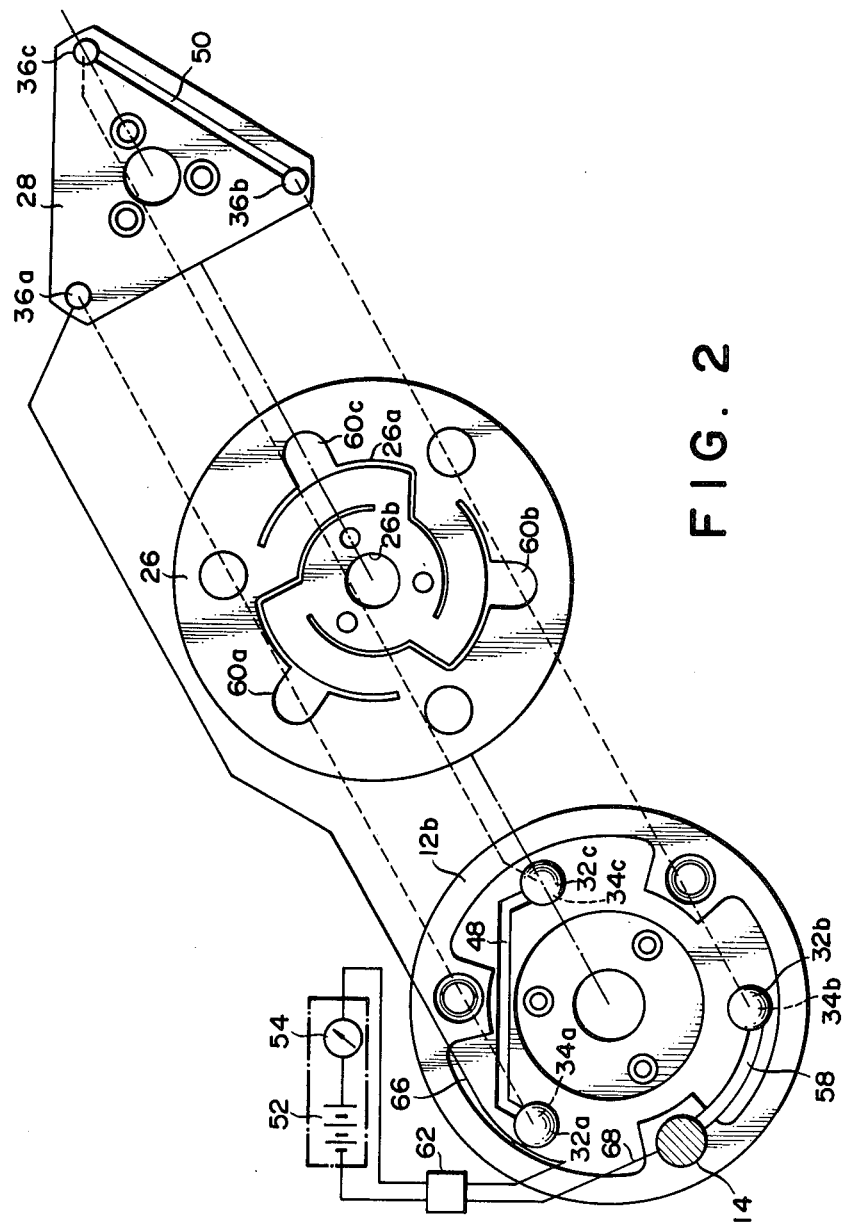
FIG. 2 is an illustration showing a relation among a contact plate, a leaf spring and a lower probe case.

FIG. 2 describes the relation among the contact plate 28, the leaf spring 26 and the lower probe case 12b in details.

The steel balls 32a, 32b and 32c provided in the bottom of the lower probe case 12b engage with the contact point screws 36a, 36b and 36c of the contact plate 28. The steel balls 32b and 32c are electrically coupled together by a copper plate 50 extending between contact points 36b and 36c provided in the contact plate 28. Furthermore, a power source 52 and a contact detecting meter 54 are connected in series, the one end of which is connected to the contact point screw 36a of the contact plate 28 and the other end of which is connected to the screw 14. Lead wires, therefore, can be easily contained in the small probe case 12 since the screw 14 is utilized as one portion of the lead wire of the detecting circuit.

Accordingly, formed therein is a loop of the contact detecting meter 54—the contact point screw 36a—the steel ball 32a—the copper plate 48—the steel ball 32c—the contact point screw 36c—the copper plate 50—the contact point screw 36b—the steel ball 32b—the copper plate 58—the screw 14—the power source 52—so that it becomes possible to detect a touch between the contact sensor 22 attached on the pointed end of the contact sensor shaft 20 and an object to be measured. In other words, in the non-contact state between the contact sensor 22 and the object to be measured, three contact point groups of the steel ball 32a and the contact point screw 36a, the steel ball 32b and the contact point screw 36b, and the steel ball 32c and the contact point screw 36c are all engaged together and the contact detecting meter 54 shows the conductive state, but, on the other hand, when the contact sensor 22 gets in touch with the object to be measured, the contact sensor shaft 20 is tilted, or moved up or down and either one of three contact point groups of the steel ball 32a and the contact point screw 36a, the steel ball 32b and the contact point screw 36b, and the steel ball 32c and the contact point screw 36c is disconnected so that the contact detecting meter 54 shows the non-conductive state, and it is possible to accurately detect the touch between the contact sensor 22 and the object to be measured.

Furthermore, in FIG. 2 the leaf spring 26 has such composition that the slots 26a are formed in the predetermined shape. This leaf spring 26 is fixed to the contact sensor shaft 20 on the inner end 26b, and to the probe case 12 on the outer end as previously described. The contact sensor shaft 20, therefore, can be regulated correctly in the diameter direction by the leaf spring 26, and be tilted or moved up and down. In the positions facing with the steel balls 32a, 32b and 32c formed therein are holes 60a, 60b and 60c which keep the steel balls 32a, 32b and 32c, and the contact point screws 36a, 36b and 36c in the insulated state.

In FIGS. 1 and 2, through the side wall of the upper probe case 12a a plug 62 is inserted and fixed by an attachment plate 64, and the lead wires 66 and 68 of the plug 62 are directly connected to the contact point screw 36a and the screw 14. Accordingly, since the lead wires can be kept short in length, the probe can be made in smaller sizes.

The embodiment of the present invention is composed as heretofore mentioned, and the operation will be hereinafter described.

In FIGS. 1 and 2, the contact sensor shaft 20 is held by the leaf spring 26 so that it can be freely tilted. The urging force of the spring 40 regulates the contact sensor shaft 20 in the central position. The contact point screws 36a, 36b and 36c respectively engage with the steel balls 32a, 32b and 32c, and the contact detecting meter 54 shows in the conductive state.

When the contact sensor 22 is fixed on the pointed end of the contact sensor shaft 20 touches an object to be measured, as previously described, the contact sensor shaft 20 is tilted or moved up and down, and the touch can be detected in the contact detecting meter 54 by either one of the contact groups of the steel ball 32a and the contact point screw 36a, the steel ball 32b and the contact point screw 36b, and the steel ball 32c and the contact point screw 36c. At this time if the moving base should overrun, the contact sensor shaft 20 and the contact sensor 22 can be prevented from damage, since the contact sensor shaft 20 can be tilted to the probe case 12. Furthermore, the stopper 16a and the edge 42 of the lower probe case 12b regulate the contact sensor shaft 20 not to go over the predetermined angle, and the leaf spring 26 can be protected from strain and breakage.

When the contact sensor 22 is detached from the object to be measured, the contact sensor shaft 20 returns to the central position by the urging forces of the spring 40 and the leaf spring 26, and three contact point groups of the steel ball 32a and the contact point screw 36a, the steel ball 32b and the contact point screw 36b, and the steel ball 32c and the contact point screw 36c are reset to be in the connected state.

As mentioned heretofore, according to the present invention, the touch signal probe can be obtained in small sizes and in light weight. Therefore, the cost of the measuring apparatus can be lowered and the operation of the apparatus can become easy, as the moving table on which the probe is attached need not be made with strength.

Since the upper probe case 12a and the lower probe case 12b can be detached by the releases of the screws 14, the touch signal probe can be easily dismantled or assembled, and the leaf spring 26 is easily exchanged. Furthermore, as the lead wire 68 is connected to the steel ball 32b by way of the screw 14 from the plug 62 and this screw 14 is utilized as one portion of the lead wire in the detecting circuit, the lead wire can be arranged short in length, and, especially, the lead wire can be easily contained in the probe case 12 of small volume.

The leaf spring 26, the contact plate 28 and the probe case 12 are fixed so firmly that the contact plate 28 can be prevented from rotation and the contact can be protected from disconnection by slipping-off between the contact point screws 36a, 36b and 36c and the steel balls 32a, 32b and 32c.

The contact sensor 22 can be easily exchanged and various kinds of contact sensor can be selected and used in response to the shapes and sizes of the object to be measured as the contact sensor 22 can be easily detached from the contact sensor shaft 20. In relation to this, the contact sensor shaft 20 and the contact sensor 22 are respectively prepared concave portions 20a and 22a to form an engaging portion with jigs such as a spanner or the like so that the contact sensor shaft cannot be forced by a massive power when the contact sensor 22 is detached.

Furthermore, movement of the contact point screws 36a, 36b and 36c can optionally select and adjust the central position of the contact sensor shaft 20.

In the embodiment, the leaf spring 26 is made in the circular shape as shown in FIG. 2, but, in the present invention, the shape of the leaf spring 26 can be optionally selected, and, for example, it is possible to be made in rectangular or triangle shape or the like.

As described heretofore, a touch signal probe in small sizes and in light weight can be obtained by the touch signal probe in accordance with the teachings of the present invention.

What is claimed is:

1. A touch signal probe comprising:
   a shank;
   a probe case being fixed to said shank by a shank fastener;
   a contact sensor shaft being held to be capable of tilting to said probe case;
   a leaf spring, the inner end of which is fixed to said contact sensor shaft and the outer end of which is fixed to said probe case so that said contact sensor shaft can be regulated to the position in the diameter direction;
   three stationary contact bases fixed to the inner bottom of said probe case;
   a contact plate being fixed to said contact sensor shaft and having three movable contact bases which engage with said stationary contact bases;
   a spring pressing said movable contact bases to said stationary contact bases; and
   a ring shaped stopper prepared and arranged with said shank fastener with a predetermined gap around said contact sensor shaft.

2. A touch signal probe according to claim 1, wherein a contact sensor is detachably fixed to said contact sensor shaft.

* * * * *